US009973527B2

(12) United States Patent
Bhargav-Spantzel et al.

(10) Patent No.: US 9,973,527 B2
(45) Date of Patent: May 15, 2018

(54) CONTEXT-AWARE PROACTIVE THREAT MANAGEMENT SYSTEM

(71) Applicant: Intel Corporation, Santa Clara, CA (US)

(72) Inventors: Abhilasha Bhargav-Spantzel, Santa Clara, CA (US); John B. Vicente, Roseville, CA (US); Mohammad R. Haghighat, San Jose, CA (US); Oliver W. Chen, El Dorado Hills, CA (US); Hormuzd M. Khosravi, Portland, OR (US); Uri Kahana, Givat-Ada (IL)

(73) Assignee: INTEL CORPORATION, Santa Clara, CA (US)

( * ) Notice: Subject to any disclaimer, the term of this patent is extended or adjusted under 35 U.S.C. 154(b) by 53 days.

(21) Appl. No.: 14/359,969

(22) PCT Filed: Nov. 19, 2013

(86) PCT No.: PCT/US2013/070858
§ 371 (c)(1),
(2) Date: May 22, 2014

(87) PCT Pub. No.: WO2015/076790
PCT Pub. Date: May 28, 2015

(65) Prior Publication Data
US 2015/0195301 A1 Jul. 9, 2015

(51) Int. Cl.
*G06F 12/14* (2006.01)
*H04L 29/06* (2006.01)
(Continued)

(52) U.S. Cl.
CPC ........ *H04L 63/1441* (2013.01); *G06F 3/0484* (2013.01); *G06F 17/30864* (2013.01);
(Continued)

(58) Field of Classification Search
CPC . H04L 63/1441; G06F 21/552; G06F 21/577; G06F 3/0484; G06F 17/30864; G06F 2221/2105
See application file for complete search history.

(56) References Cited

U.S. PATENT DOCUMENTS 8,332,947 B1 12/2012 Bregman et al.
8,370,407 B1 2/2013 Deverajan et al.
(Continued)

FOREIGN PATENT DOCUMENTS

CN 103065086 A 4/2013
WO 2012-129354 A1 9/2012

OTHER PUBLICATIONS

Notice Concerning Transmittal of International Preliminary Report on Patentability, dated Jun. 2, 2016, and Written Opinion, issued in corresponding PCT Application No. PCT/US2013/070858.
(Continued)

*Primary Examiner* — Mohammed Waliullah
(74) *Attorney, Agent, or Firm* — Grossman Tucker Perreault & Pfleger, PLLC (57) ABSTRACT

This disclosure is directed to a context-aware proactive threat management system. In general, a device may use internal activity data along with data about external activities (e.g., provided by remote resources) for threat assessment and mitigation. A device may comprise, for example, a hostile environment detection (HED) module to coordinate threat assessment and mitigation. The HED module may accumulate internal activity data (e.g., from security services in the device), and external activity data regarding a system environment and/or a physical environment from the remote resources. The HED module may then assess threats based on the activity data and determine automated and/or manual mitigation operations to respond to the threats. In one embodiment, visualization features may also be used to, (Continued)

for example, visualize threats to a user, visualize automatic/manual mitigation operations, request user confirmation regarding the performance of manual mitigation operations, etc.

25 Claims, 5 Drawing Sheets

(51) Int. Cl.
*G06F 3/0484* (2013.01)
*G06F 17/30* (2006.01)
*G06F 21/55* (2013.01)
*G06F 21/57* (2013.01)

(52) U.S. Cl.
CPC .......... *G06F 21/552* (2013.01); *G06F 21/577* (2013.01); *G06F 2221/2105* (2013.01)

(56) References Cited

U.S. PATENT DOCUMENTS

| | | | |
|---|---|---|---|
| 2007/0209074 A1 | 9/2007 | Coffman | |
| 2008/0263677 A1 | 10/2008 | Kaditz et al. | |
| 2009/0265756 A1* | 10/2009 | Zhang | G06F 21/53 726/1 |
| 2010/0077481 A1 | 3/2010 | Polyakov et al. | |
| 2010/0100964 A1* | 4/2010 | Mahaffey | G06F 21/577 726/25 |
| 2010/0275263 A1* | 10/2010 | Bennett | G06F 21/577 726/25 |
| 2013/0097711 A1* | 4/2013 | Basavapatna | H04W 4/02 726/25 |
| 2013/0160119 A1 | 6/2013 | Sartin et al. | |
| 2013/0160129 A1 | 6/2013 | Sartin et al. | |
| 2013/0227681 A1* | 8/2013 | Hong | G06F 21/51 726/22 |
| 2013/0298192 A1* | 11/2013 | Kumar, Sr. | G06F 21/52 726/3 |
| 2013/0298230 A1 | 11/2013 | Kumar et al. | |
| 2014/0359777 A1* | 12/2014 | Lam | G06F 21/577 726/25 |

OTHER PUBLICATIONS

International Search Report, dated Aug. 21, 2014, issued in corresponding PCT Application No. PCT/US2013/070858.
European Extended Search Report issued in European Application No. 13897947.1, dated Mar. 27, 2017, 7 pages.
Chinese Office Action issued in Chinese Application No. 201380080351.1, dated Jan. 19, 2018, with English translation, 18 pages.
European Office Action issued in European Application No. 13897947.1, dated Mar. 9, 2018, 7 pages.
Anonymous: "Augmented Reality Technology to the Service of Industrial Maintenance I Augmented Reality Software and Solutions by Total Immersion", Aug. 16, 2012 (Aug. 16, 2012), XP055456069, Retrieved from the Internet: URL: https://web.archive.org/web/20120816065210/http://www.t-immersion.com/augmented-realityuse-cases/industrial-maintenance, retrieved on Mar. 2, 2018.

* cited by examiner

CONTEXT-AWARE PROACTIVE THREAT MANAGEMENT SYSTEM

TECHNICAL FIELD

The present disclosure relates to device security, and more particularly, to a security scheme that may account for possible threats in the device, system and physical environment.

BACKGROUND

The evolution of electronic communication technology has helped to drive its rapid acceptance and utilization in both professional and personal settings. People have come to rely upon electronic communication not only for personal interaction, but may also employ their communication-enabled devices to perform various transactions. For example, users may employ a variety of device (e.g., smart phones, tablet/laptop/desktop computers, etc.) when conducting purchase transaction, banking transactions, business-related transactions, etc. As a result, more and more personal, financial, business-related information is being accumulated, turning these electronic devices into sensitive information silos. For example, an electronic device may comprise the user's name, address, social security number, driver's license number, financial account numbers, account balance information, business contact information, business account numbers, business security codes and even in some instances extremely confidential information like governmental security and access codes.

Existing measures for protecting a device and its contents may focus on localized threat neutralization measures. For example, virus protection, a hardware/software-based firewalls, etc. may be implemented to guard against viruses, malware, etc. User identity verification systems (e.g., password entry, biometric identification, etc.) may also help to thwart access attempts by unauthorized users that get control of a device. However, these known measures are becoming outmoded as those seeking unauthorized access hone their skills. For example, new software-based attacks are designed specially to either avoid or overcome the protection provided by existing protection software. These enhanced attacks may be bolstered by non-software-based measures such as surveillance, trickery, deception, etc. that may occur in person, via electronic communication (e.g., with a device owner, a service provider, etc.), etc. As a result, even though a user is vigilant, it may still be possible for the operation of their device to become comprised along with their information.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure is directed to a context-aware proactive threat management system. In general, a device may use internal activity data along with data about external activities (e.g., provided by remote resources) for threat assessment and mitigation. A device may comprise, for example, a hostile environment detection (HED) module to coordinate threat assessment and mitigation. The HED module may accumulate internal activity data (e.g., from security services in the device), and external activity data regarding a system environment and/or a physical environment from the remote resources. The HED module may then assess threats based on the activity data and determine automated and/or manual mitigation operations to respond to the threats. In one embodiment, visualization features may also be used to, for example, visualize threats to a user, visualize automatic/manual mitigation operations, request user confirmation regarding the performance of manual mitigation operations, etc.

In one embodiment, a device for use with a context-aware threat management system may comprise, for example, a communication module and a HED module. The communication module may be to interact with at least remote resources external to the device. The HED module may be to receive internal activity data from security services within the device and receive external activity data from the remote resources via the communication module. After receiving the internal and external activity data, the HED module may further be to determine threats to the device based on at least one of the internal activity data or the external activity data and determine mitigation operations in response to any determined threats.

In one embodiment, the remote resources may comprise at least one computing device accessible via a wide area network (WAN) including at least one of information technology (IT) services, global threat intelligence services or reputation services. The HED module being to receive internal activity data from security services within the device may comprise the HED module being to receive security data related to at least one of device configuration, device operation or device content. The HED module being to receive external activity data from the remote resources may comprise the HED module being to receive data related to at least one of threats existing in a systemic environment capable of communicating with the device or threats existing in a physical environment in which the device is operating. The HED module being to determine threats to the device based on at least one of the internal activity data or the external activity data may comprise the HED module being to determine at least one of threats to device operation or threats to information stored in the device.

In the same or another embodiment, the device may further comprise a user interface module to present information to a user, the HED module further being to cause the user interface module to visualize any determined threats to the user by the user interface module. The HED module being to determine mitigation operations in response to any determined threats may comprise the HED module being to determine at least one of automated mitigation operations or manual mitigation operations. The HED module may further be to cause the automated mitigation operations to be performed by at least one of the device or the remote resources. The HED module may further be to cause the user interface module to visualize at least one of the automated mitigation operations or the manual mitigation operations to the user. The HED module may further be to cause the user to be queried via the user interface, the query being to determine if the user has undertaken any manual mitigation operations visualized by the user interface module. The HED module may further be to cause data regarding at least one of the threats or the mitigation operations to be transmitted to the remote resources via the communication module. An example method for use context-aware threat management consistent with the present disclosure may comprise receiving internal activity data from security services within a device, receiving external activity data from remote resources external to the device, determining threats to the device based on at least one of the internal activity data or the external activity data and determining mitigation operations in response to any determined threats.

Figure 1:
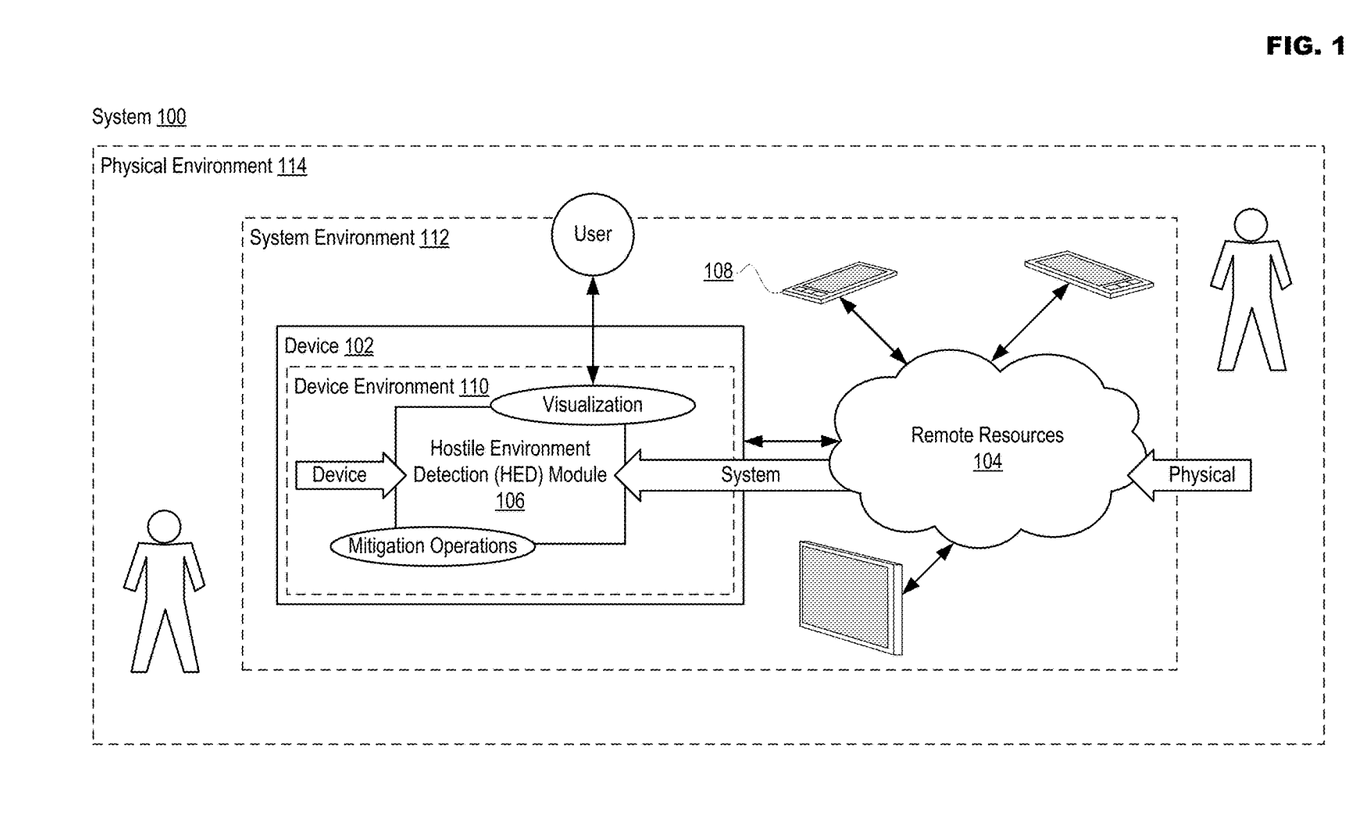
FIG. 1 illustrates an example context-aware proactive threat management system in accordance with at least one embodiment of the present disclosure.

FIG. 1 illustrates an example context-aware proactive threat management system in accordance with at least one embodiment of the present disclosure. A "threat," as referenced herein, may pertain to any activity that, if perpetrated, may result in the operation of a device becoming comprised or the information in the device becoming accessible to an unauthorized party. Threats may exist outside the physical device itself. For example, threats may exist in a system environment in which the device is participating in the form of programs attempting to gain access to a device from a network, "Trojan horse" programs being hidden on Internet pages, etc. Threats may also exist in a physical environment in which a device operates such as, for example, others observing a user's actions, perpetrating trickery, stealing devices, etc.

As opposed to existing protection measures operating only at the device level to guard against software-driven attacks (e.g., viruses, malware, etc.), example system 100 may utilize a multi-environment threat assessment and mitigation approach. System 100 may comprise, for example, device 102 and remote resources 104. Examples of device 102 may include, but are not limited to, a mobile communication device such as a cellular handset or a smartphone based on the Android® OS, iOS®, Windows® OS, Blackberry® OS, Palm® OS, Symbian® OS, etc., a mobile computing device such as a tablet computer like an iPad®, Surface®, Galaxy Tab®, Kindle Fire®, etc., an Ultrabook® including a low-power chipset manufactured by Intel Corporation, a palmtop, a netbook, a notebook, a laptop, etc., a typically stationary computing device such as a desktop, a set-top box, a smart television, etc. Remote resources 104 may comprise, for example, at least one computing device accessible via a local-area network (LAN) or a wide-area network (WAN). In one embodiment, remote resources 104 may comprise one or more servers configured in a "cloud" computing scheme.

Device 102 may comprise at least HED module 106. During operation, HED module 106 may receive activity data from a variety of sources. Activity data may include any data usable for determining threats to device 102. For example, HED module 106 may receive internal activity data pertaining to device environment 110 (e.g., an operating system (OS) in device 102) from security services in device 102. Internal activity data may be related to, for example, device configuration, device operation or device content (e.g., programs, services, data, etc. in device 102). External activity data may also be received from remote resources 104 pertaining to system environment 112 (e.g., wired/wireless networks including other devices 108 with which device 102 may be capable of communicating, etc.) and physical environment 114 (e.g., people, structures, vehicles, equipment, etc. proximate to device 102). HED module 106 may accumulate the activity data received from device environment 110, system environment 112 and physical environment 114, may analyze the activity data for any threats to device 102 and may formulate responses (e.g., mitigation operations) to the threats. Threat assessment and mitigation operations may be accompanied by visualization to a user of device 102. For example, a user interface in device 102 may cause threat data or mitigation operation data to be presented to the user. Visualization may include causing the data to be presented on a display in device 102 or on another display coupled to device 102 (e.g., an external display within view of the user), may include sound, vibration or another form of indication to attract the attention of the user, etc. In one embodiment, visualization may include "augmented reality" wherein indicia, images, etc. may be superimposed over physical environment 114 seen by the user (e.g., as video captured by a camera in or coupled to device 102, as seen through eyewear including at least a display for presentation, etc.).

System 100 is readily applicable to a variety of circumstances. For example, a user of device 102 may be in an unfamiliar area (e.g., physical environment 114) and may desire to access the Internet to transmit/receive data, perform financial transactions, etc. Access points (APs) to connect to the Internet may be available to device 102 via a variety of wired/wireless LANs (e.g., system environments 112). Some of these APs may be in public locations (e.g., restaurants, hotels, etc.), over public networks that are unsecured, etc. Without system 100, an ill-advised user may couple device 102 to the first available AP without knowing if threats exist. Thus, the operation and contents of device 102 may be exposed to local threats (e.g., viruses/malware), systemic threats (e.g., remote hacks) and or physical threats (e.g., theft).

In system 100, HED module 106 may prevent the user from such inadvertent exposure. HED module 106 may receive internal and/or external activity data 104 (e.g., from remote resources 104), may assess the activity data and may formulate mitigation operations in response to the threats. HED module 106 may receive this data in real time, periodically, on the occurrence of an event (e.g., the detection of a threat), etc. Mitigation operations may be automated or manual. For example, HED module 106 may determine that, upon accessing a LAN, device 102 uploaded possibly harmful software. The elimination of this software may be an automated threat mitigation operation. HED module 106 may also receive data indicating that a particular network is not secure, that other devices 108 on the network are running software typically associated with hackers (e.g., hacker tools), that police reports indicate devices have recently been stolen from the location where the network is operating, etc. To some degree, automated mitigation features may attempt to protect device 102 from these threats by, for example, blocking access to certain network features that could corrupt device 102, blocking questionable devices from accessing device 102, etc. However, a more effective preventative measure may be for HED module 106 to cause device 102 to visualize the threats along with manual mitigation operations such as, for example, advising the user not to connect device 102 to an unsafe network and/or suggesting a safer way to access the Internet, if available. For example, HED module 106 may cause a list of alternative APs to be to be presented to the user along with information such as, for example, distance to the AP from the user's current location, safety and reliability data about each AP, etc.

In another example, device 102 may be executing a compromised application that is causing personal information (e.g., contacts information) to be leaked to a malicious website. HED module 106 may receive data about the application from an internal source (e.g., device security services) and/or from remote resources 104. HED module 106 may then determine mitigation operations including, for example, disabling this service. The configuration of device 102 may prescribe what needs to happen to mitigate the threat locally (e.g., to disable the comprised application), but this may only be the initial mitigation provision. This action may initiate a pattern which is fed back to a policy in device 102 and/or remote resources 104 which updates how to identify the threat in the future, advises the user of device 102 about manual operations given that the user's personal information may have been comprised, etc.

Figure 2:
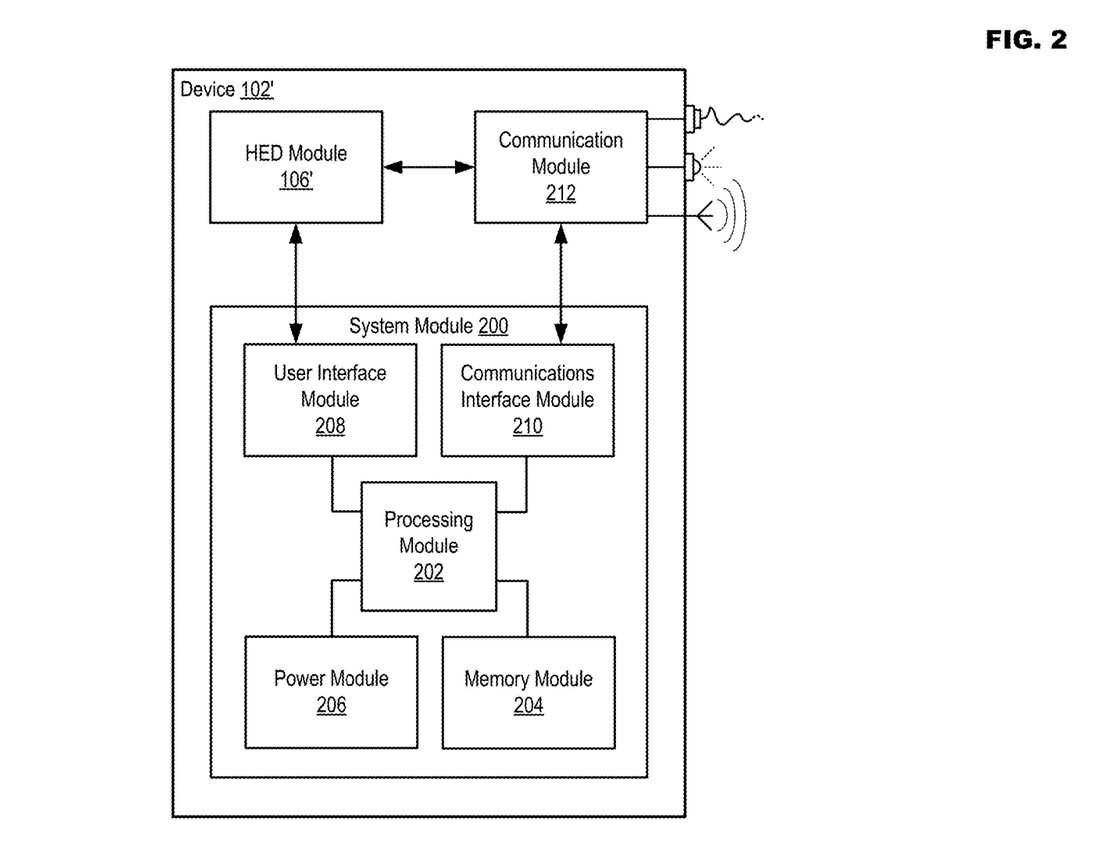
FIG. 2 illustrates an example configuration for a device in accordance with at least one embodiment of the present disclosure.

FIG. 2 illustrates an example configuration for a device in accordance with at least one embodiment of the present disclosure. Device 102' may be capable of performing some or all of the example functionality shown in FIG. 1. However, device 102' is meant only as an example of equipment usable in embodiments consistent with the present disclosure, and is not meant to limit these various embodiments to any particular manner of implementation.

Device 102' may comprise system module 200 to manage general device operations. System module 200 may include, for example, processing module 202, memory module 204, power module 206, user interface module 208 and communication interface module 210. Device 102' may also include communication module 212 and HED module 106'. While communication module 212 and HED module 106' have been shown separately from system module 200, the example implementation of device 102' has been provided merely for the sake of explanation herein. Some or all of the functionality associated with communication module 212 and/or HED module 106' may also be incorporated within system module 200.

In device 102', processing module 202 may comprise one or more processors situated in separate components, or alternatively, may comprise one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 102'. Some or all of the functionality commonly associated with the support circuitry may also be included in the same physical package as the processor (e.g., such as in the Sandy Bridge family of processors available from the Intel Corporation).

Processing module 202 may be configured to execute various instructions in device 102'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include memory configured to hold information during the operation of device 102' such as, for example, static RAM (SRAM) or Dynamic RAM (DRAM). ROM may include memories such as Bios or Unified Extensible Firmware Interface (UEFI) memory configured to provide instructions when device 102' activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc.

Power module 206 may include internal power sources (e.g., a battery) and/or external power sources (e.g., electromechanical or solar generator, power grid, fuel cell, etc.), and related circuitry configured to supply device 102' with the power needed to operate. User interface module 208 may include equipment and/or software to allow users to interact with device 102' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The equipment in user interface module 208 may be incorporated within device 102' and/or may be coupled to device 102' via a wired or wireless communication medium.

Communication interface module 210 may be configured to handle packet routing and other control functions for communication module 212, which may include resources configured to support wired and/or wireless communications. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular wide-area radio communication technology, satellite-based communications, etc.). In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission.

In the embodiment shown in FIG. 2, HED module 106' may be configured to interact with at least user interface module 208 and communication module 212. During operation, HED module 106' may utilize communication module 212 to interact with remote resources 104. For example, HED module 106' may use communication module 212 to receive activity data regarding system environment 112 and/or physical environment 114 and also to transmit feedback information regarding sensed threats, mitigation operations, etc. to remote resources 104. When threats are detected, HED module 106' may employ user interface module 208 to, for example, visualize the threats, visualize automated and/or manual mitigation operations, request confirmation of manual mitigation operation completion from the user, etc.

Figure 3:
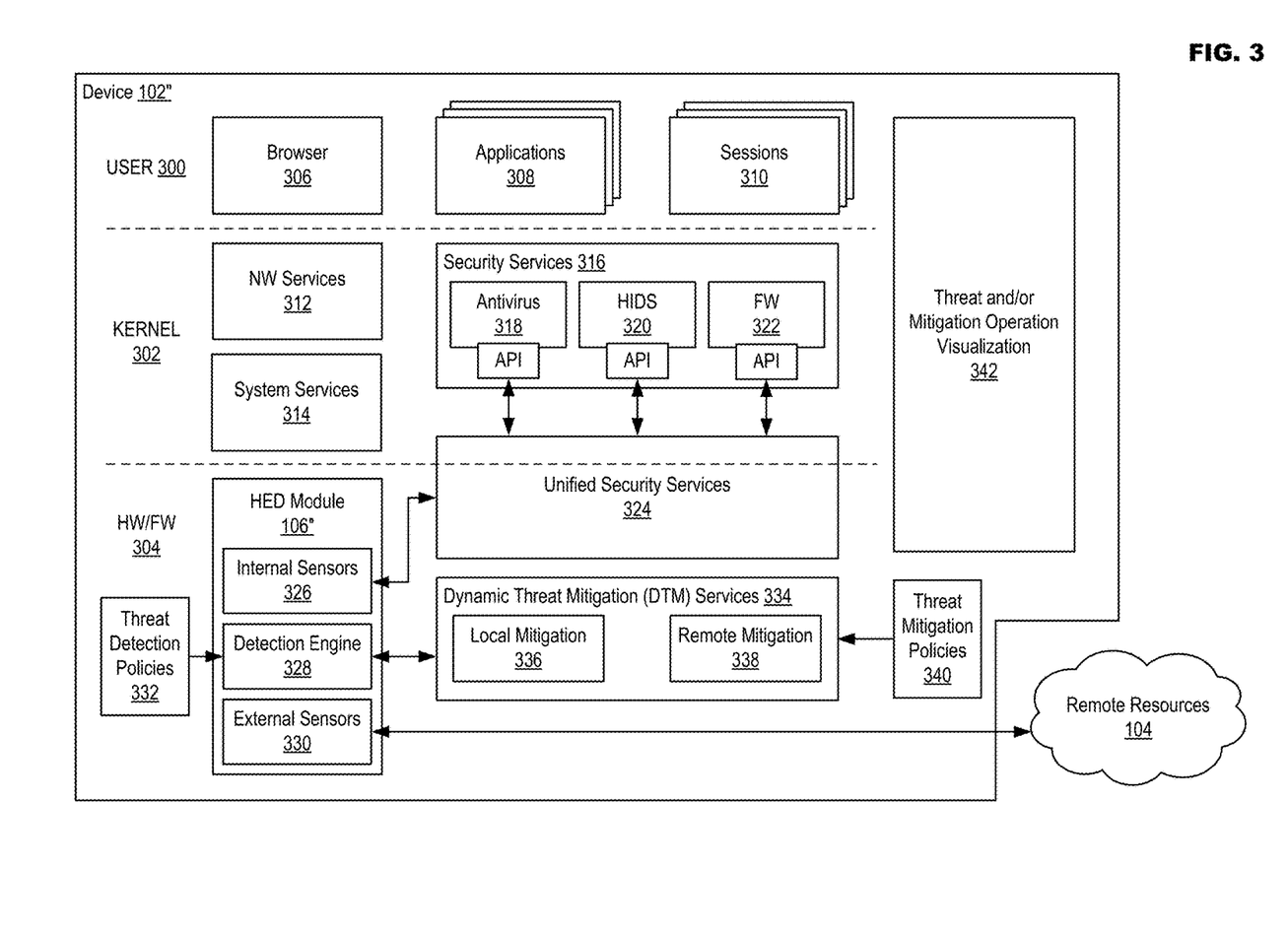
FIG. 3 illustrates an example of how a hostile environment detection (HED) module may be integrated into device architecture in accordance with at least one embodiment of the present disclosure.

FIG. 3 illustrates an example of how HED module 106' may be integrated into device architecture in accordance with at least one embodiment of the present disclosure. Device 102" may comprise various software (e.g., applications and services) executing at different privilege levels including, for example, user level privilege 300, kernel level privilege 302 and hardware/firmware (HW/FW) level privilege 304. User level privilege 300 may include various programs running at a low privilege level such as browser 306, applications 308 and sessions 310. These are examples of programs typically executed in the OS of device 102".

Kernel privilege level 302 may include services for managing the interaction of the OS of device 102" to equipment in HW/FW privilege level 304. Examples of these services may include, but are not limited to networking (NW) services 312 and system service 314. Security services 316 may also be incorporated in kernel privilege level 302. For example, security services 316 may comprise antivirus services 318, host intrusion prevention services (HIDS) 320 and firmware (FW) services 322 for protecting against software-based attacks. Each of services 318, 320 and 322 may also comprise an application program interface (API) linking services 318, 320 and 322 to unified security services 324 in HW/FW level 304.

Initially, some or all of the security-related services in HW/FW privilege level 304 may be secured within a trusted execution environment (TEE). The TEE may be a secure workspace in which known-good programs may executed, confidential information may be stored in a secure manner, etc. For example, the TEE may employ Software Guard Extensions (SGX) technology developed by the Intel Corporation. SGX may provide a safe and hardware-encrypted computation and storage area inside of system memory, the contents of which cannot be deciphered by privileged code or even through the application of hardware probes to memory bus. When the TEE resides within an SGX, embodiments consistent with the present disclosure make it impossible for an intruder to decipher the contents of TEE 108. In particular, the identity of programs (e.g., based on a cryptographic hash measurement of each program's contents) may be signed and stored inside each program. When the programs are then loaded, the processor verifies that the measurement of the program (e.g., as computed by the processor) is identical to the measurement previously embedded inside the program. The signature used to sign the embedded measurement is also verifiable because the processor is provided with a public key used to verify the signature at program load time. This way malware can't tamper with the program without also altering its verifiable measurement.

At least part of unified security services 324 may reside in HW/FW privilege level 304. Unified security services 324 may accumulate activity data from the lower privilege levels in regard to threats in device environment 110. For example, security services 316 may pass along information about viruses, malware, unauthorized attempts to access device 102", etc. to unified security services 324. The local threat information may then be passed to internal sensors 326 in HED module 106", which may be tasked with collecting internal activity data. HED module 106" may accumulate the internal activity data along with external activity data provided to external sensors 330 (e.g., tasked with collecting external activity data) from remote resources 104. In an example of operation, HED module 106" may cause situational data to be provided to remote resources 104 (e.g., identification data, location data, data identifying networks sensed within communication range of device 102", etc.). Remote resources 104 may then respond with external activity data pertaining to the location of device 102", the networks in proximity of device 102", etc. Detection engine 328 may then analyze the accumulated activity data based on threat detection policies 332.

Threat detection polices 332 may identify certain activities, or combinations of activities, that identify a threat for which mitigation operations are needed. For example, device 102" being in a questionable physical environment 114 that comprises an unsafe system environment 112 may require a mitigation operation. In this regard, at least detection engine 328 may interact with dynamic threat mitigation (DTM) services 334 to generate mitigation operations. The threat mitigation operations may be "dynamic" in that the mitigation operations may change or be updated based on new data received by local sensors 326 (e.g., as issues are resolved or new threats emerge) and remote sensors 330 (e.g., as device 102" couples to new networks, moves to a new physical location, etc.). DTM services 334 may generate local mitigation operations 336 and remote mitigation operations 338 based on threat mitigation polices 340. Threat mitigation polices 340 may prescribe one or more operations for responding to each threat and/or combinations of threats identified by detection engine 328. Local mitigation operations 336 may be executed within device 102" (e.g., increasing virus/malware scanning, limiting application execution/permissions, instituting password protection for accessing the device, initiating/increasing device position logging for remote location determination, etc.). Remote mitigation operations 338 may be executed outside of device 102" (e.g., disallowing connections from some/all other devices, initiating/increasing backups to an external storage location, logging device location, reporting threats sensed proximate to device 102", etc.).

Local mitigation operations 336 and remote mitigation operations 338 may either be automated or manual operations. An automated operation may be performed by device 102" and/or remote resources 104 without intervention by the user. Example automated mitigation operations may include DTM services 334 causing device 102" to reconfigure virus/malware protection, firewall strength, backup frequency, position logging, device access requirements, etc. Manual mitigation operations may require some activity from the user. Example manual mitigation operations may include placing device 102" in a secure storage location to avoid theft, moving to a different physical location, connecting device 102" to a wired LAN instead of using wireless communication, etc. In one embodiment, manual mitigation operations 340 may be prompted by threat and/or mitigation operation visualization 342. Visualization 342 may, for example, cause threat-related information to be presented to a user, may cause threat mitigation operations to be presented to a user, may cause prompting to be presented to a user regarding manual threat mitigation operations (e.g., including instructions for performing the manual threat mitigation operations and/or requests for confirmation that the manual threat mitigation operations have been completed), etc. In the same or another embodiment, HED module 106" may also cause feedback to be provided to remote resources 104 as to detected threats, threat mitigation, etc.

Figure 4:
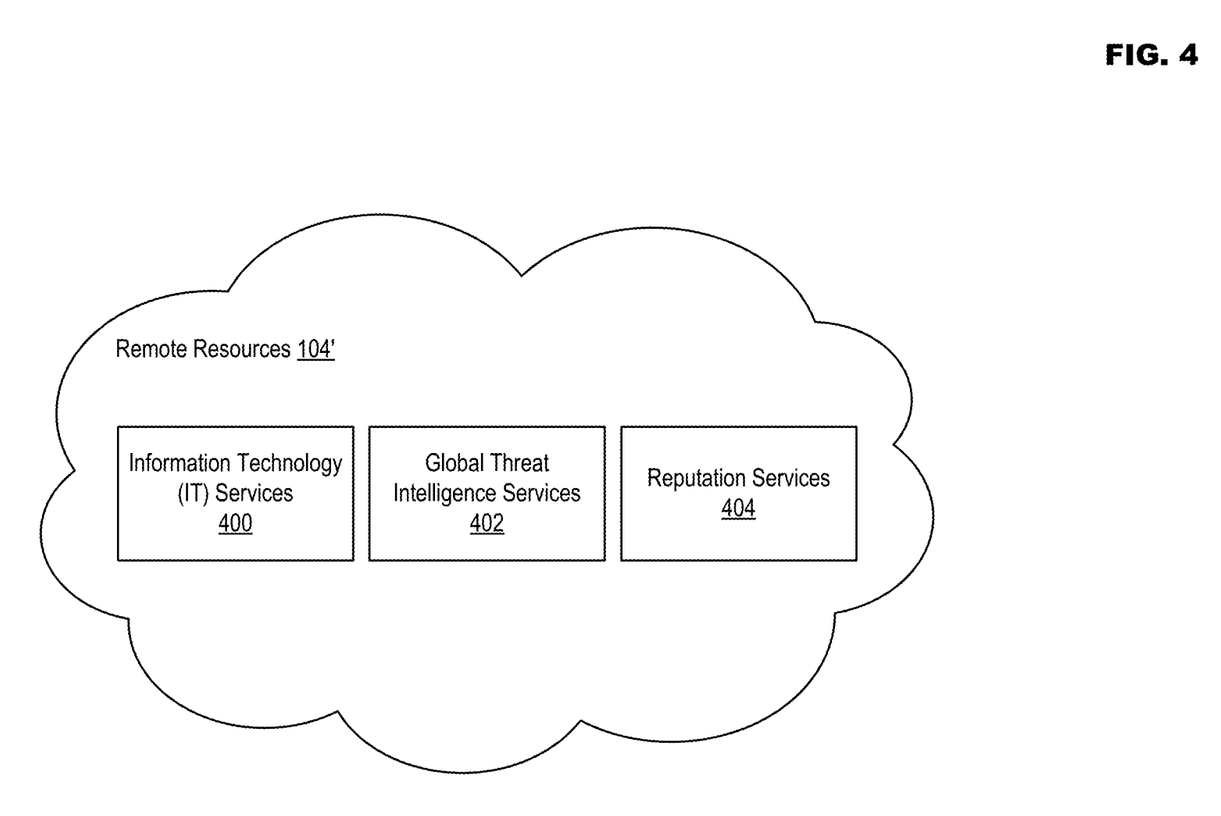
FIG. 4 illustrates an example configuration for remote resources in accordance with at least one embodiment of the present disclosure.

FIG. 4 illustrates an example configuration for remote resources in accordance with at least one embodiment of the present disclosure. Remote resources 104' may comprise, for example, information technology (IT) services 400, global threat intelligence module and reputation services 404. IT services 400 may comprise various services for supporting the operation of device 102. The features of IT services 400 may depend on, for example, the type of device 102 and how it is being used. For example, IT services 400 may be provided by corporations, educational institutions, governmental entities, etc. Example services may comprise, but are not limited to, antivirus/malware protection support, backup services, data access services, network access services, device locating services, device repair services, etc.

Global threat intelligence services 402 may comprise threat data pertaining to system environments 112 and/or physical environments 114. For example, emerging virus releases, hacking attacks, deception schemes, etc. may be tracked by global threat intelligence services 402. Incident reporting provided by IT service providers, governmental agencies (e.g., local police, Federal Bureau of Investigation (FBI), Central Intelligence Agency (CIA) may add to the data maintained by global threat intelligence services 402, which may utilize this data to inform devices 102 of potential threats. Similarly, reputation services 404 may include data provided by devices 102 when encountering threats. In this manner, the activity data within reputation services 404 may be "crowd-sourced" since it is being provided by participating devices/users. In one example of operation, reputation services 404 may log the experiences of various devices 102 in certain system environments 112 and/or physical environments 114, may determine important activity data (e.g., indicative of threats) from the logged experience data, and may provide the activity data to devices 102 near to these certain environments.

Figure 5:
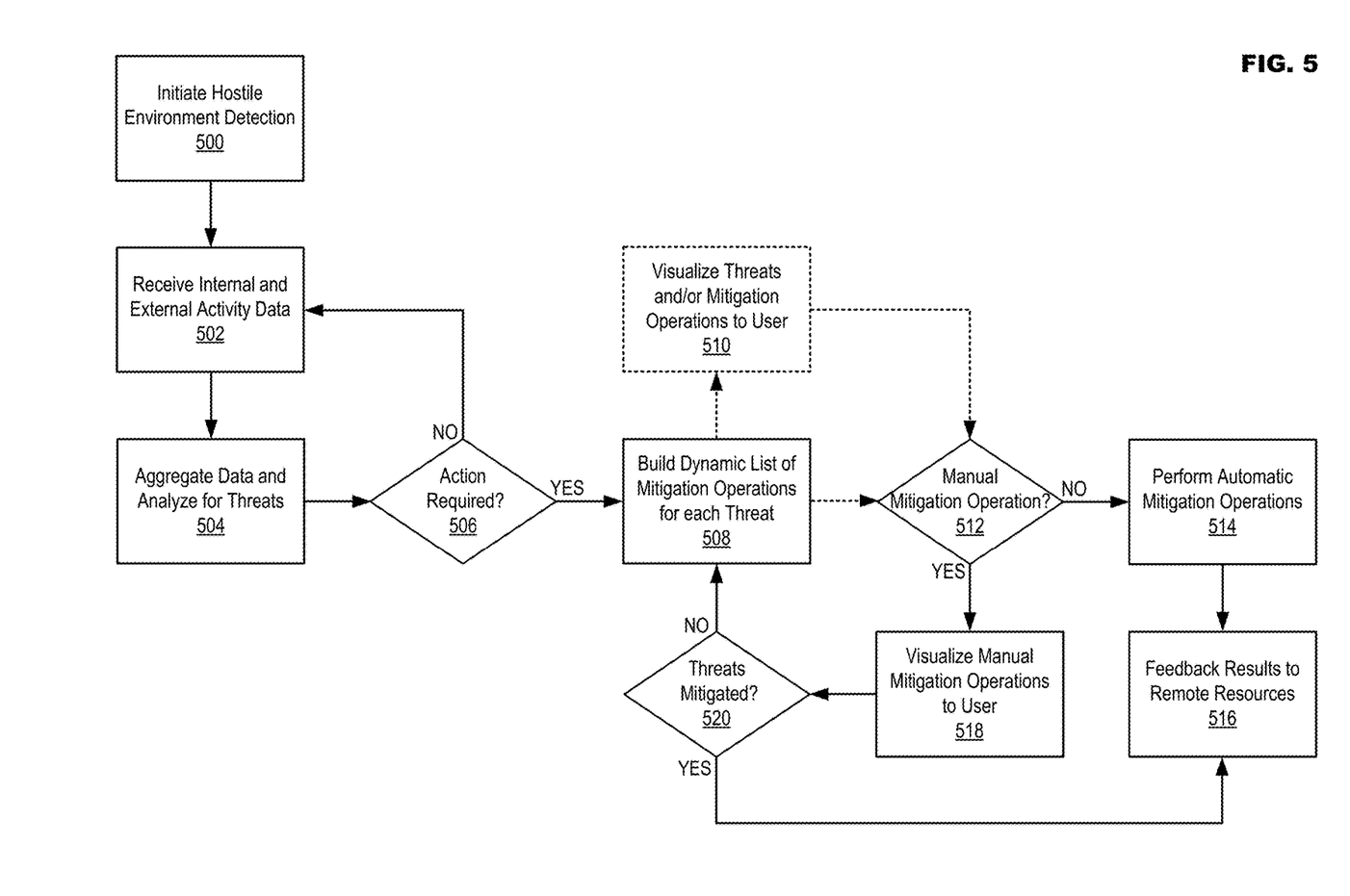
FIG. 5 illustrates example operations for a context-aware proactive threat management system in accordance with at least one embodiment of the present disclosure.

FIG. 5 illustrates example operations for a context-aware proactive threat management system in accordance with at least one embodiment of the present disclosure. Hostile environment detection may initiate in operation 500 (e.g., in a HED module within a device). In operation 502 internal activity data may be received (e.g., from security services in the device) along with external activity data (e.g., from a remote resources external to the device). The received internal and external activity information may then be aggregated and analyzed for threats in operation 504. A determination may then be made in operation 506 as to whether action is required in the device (e.g., whether the device needs to mitigate threats identified in operation 504). A determination in operation 506 that no action is required (e.g., no threats were identified in operation 504), may be followed by a return to operation 502 to wherein internal activity data and external activity data may again be received in the device.

If in operation 506 it is determined that action is required (e.g., that threats exist), then in operation 508 a dynamic list of threat mitigation operations may be built for each threat to the device. In optional operation 510, the threats and/or threat mitigation operations may be visualized to a user (e.g., presented to the user via a user interface module in the device). A determination may then be made in operation 512 as to whether any of the threat mitigation operations are manual threat mitigation operations. If it is determined in operation 512 that none of the threat mitigation operations are manual, then in operation 514 automated threat mitigation operations may be performed (e.g., by the device and/or remote resources) and in operation 516 feedback may be provided to the remote resources (e.g., for use in predicting future threats, etc.). If in operation 512 it is determined that manual threat mitigation operations are required, then in operation 518 the manual threat mitigation operations may be visualized to the user of the device. A determination may then be made in operation 520 as to whether the threats have been mitigated (e.g., that the manual threat mitigation operations visualized in operation 518 have been performed by the user). A determination in operation 520 that the threats have not been mitigated may be followed by a return to operation 508 to build a new dynamic list of threat mitigation operations. A determination in operation 520 that the threats have been mitigated may be followed by operation 520 wherein data related to the threats and/or the threat mitigation operations may be fed back to the remote resources.

While FIG. 5 illustrates operations according to an embodiment, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to a context-aware proactive threat management system. In general, a device may use internal activity data along with data about external activities (e.g., provided by remote resources) for threat assessment and mitigation. A device may comprise, for example, a hostile environment detection (HED) module to coordinate threat assessment and mitigation. The HED module may accumulate internal activity data (e.g., from security services in the device), and external activity data regarding a system environment and/or a physical environment from the remote resources. The HED module may then assess threats based on the activity data and determine automated and/or manual mitigation operations to respond to the threats. In one embodiment, visualization features may also be used to, for example, visualize threats to a user, visualize automatic/manual mitigation operations, request user confirmation regarding the performance of manual mitigation operations, etc.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a context-aware proactive threat management system, as provided below.

According to a first example there is provided a device for use with a context-aware threat management system. The device may comprise a communication module to interact with at least remote resources external to the device and a hostile environment detection (HED) module to receive internal activity data from security services within the device, receive external activity data from the remote resources via the communication module, determine threats to the device based on at least one of the internal activity data or the external activity data and determine mitigation operations in response to any determined threats.

Example 2 includes the elements of example 1, wherein the remote resources comprise at least one computing device accessible via a wide area network (WAN).

Example 3 includes the elements of example 2, wherein the at least one computing device comprises at least one of information technology (IT) services, global threat intelligence services or reputation services.

Example 4 includes the elements of any of examples 1 to 3, wherein the HED module being to receive internal activity data from security services within the device comprises the HED module being to receive security data related to at least one of device configuration, device operation or device content.

Example 5 includes the elements of example 4, wherein the security services comprise at least one of virus protection services, host intrusion detection services or firewall protection services in the device.

Example 6 includes the elements of any of examples 4 to 5, wherein the security services comprise at least one of kernel-level protection services or hardware/firmware level protection services.

Example 7 includes the elements of any of examples 1 to 6, wherein the HED module being to receive external activity data from the remote resources comprises the HED module being to receive data related to at least one of threats existing in a systemic environment capable of communicating with the device or threats existing in a physical environment in which the device is operating.

Example 8 includes the elements of example 7, wherein the threats existing in a systemic environment comprise at least one of viruses, malware or tools usable for gaining unauthorized access to the device.

Example 9 includes the elements of any of examples 7 to 8, wherein the threats existing in the physical environment comprise at least one of unauthorized users attempting to access the device or theft of the device.

Example 10 includes the elements of any of examples 1 to 9, wherein the HED module being to determine threats to the device based on at least one of the internal activity data or the external activity data comprises the HED module being to determine at least one of threats to device operation or threats to information stored in the device.

Example 11 includes the elements of example 10, wherein determining at least one of threats to device operation or threats to information stored in the device is based on threat detection polices in the device.

Example 12 includes the elements of any of examples 1 to 11, wherein the device further comprises a user interface module to present information to a user, the HED module further being to cause the user interface module to visualize any determined threats to the user by the user interface module.

Example 13 includes the elements of example 12, wherein the HED module being to determine mitigation operations in response to any determined threats comprises the HED module being to determine at least one of automated mitigation operations or manual mitigation operations.

Example 14 includes the elements of example 13, wherein the automated mitigation operations and manual mitigation operations are based on threat mitigation polices in the device.

Example 15 includes the elements of any of examples 13 to 14, wherein the automated mitigation operations comprise at least one of local mitigation operations executed within the device and remote mitigation operations executed outside of the device.

Example 16 includes the elements of any of examples 13 to 15, wherein the HED module is further to cause the automated mitigation operations to be performed by at least one of the device or the remote resources.

Example 17 includes the elements of any of examples 13 to 16, wherein the HED module is further to cause the user interface module to visualize at least one of the automated mitigation operations or the manual mitigation operations to the user.

Example 18 includes the elements of example 17, wherein visualizing the manual mitigation operations comprises visualizing at least one of a request to the user to connect to a system environment via a wired connection or suggestion that the user connect to an alternative system environment.

Example 19 includes the elements of any of examples 17 to 18, wherein the HED module is further to cause the user to be queried via the user interface, the query being to determine if the user has undertaken any manual mitigation operations visualized by the user interface module.

Example 20 includes the elements of any of examples 1 to 19, wherein the HED module is further to cause data regarding at least one of the threats or the mitigation operations to be transmitted to the remote resources via the communication module.

Example 21 includes the elements of any of examples 1 to 20, wherein the device further comprises a user interface module to present information to a user, the HED module further being to cause the user interface module to visualize any determined threats to the user by the user interface module.

Example 22 includes the elements of example 21, wherein the HED module being to determine mitigation operations in response to any determined threats comprises the HED module being to determine at least one of automated mitigation operations or manual mitigation operations and cause the automated mitigation operations to be performed by at least one of the device or the remote resources.

Example 23 includes the elements of example 22, wherein the HED module is further to at least one of cause the user interface module to visualize at least one of the automated mitigation operations or the manual mitigation operations to the user or cause the user to be queried via the user interface, the query being to determine if the user has undertaken any manual mitigation operations visualized by the user interface module.

According to example 24 there is provided a method for context-aware threat management. The method may comprise receiving internal activity data from security services within a device, receiving external activity data from remote resources external to the device, determining threats to the device based on at least one of the internal activity data or the external activity data and determining mitigation operations in response to any determined threats.

Example 25 includes the elements of example 24, and further comprises aggregating the internal activity data and external activity data prior to determining the threats to the device.

Example 26 includes the elements of any of examples 24 to 25, wherein receiving internal activity data from security services within the device comprises receiving security data related to at least one of device configuration, device operation or device content.

Example 27 includes the elements of example 26, wherein the security services comprise at least one of virus protection services, host intrusion detection services or firewall protection services in the device.

Example 28 includes the elements of any of examples 26 to 27, wherein the security services comprise at least one of kernel-level protection services or hardware/firmware level protection services.

Example 29 includes the elements of any of examples 24 to 28, wherein receiving external activity data from the remote resources comprises receiving data related to at least one of threats existing in a systemic environment capable of communicating with the device or threats existing in a physical environment in which the device is operating.

Example 30 includes the elements of example 29, wherein the threats existing in a systemic environment comprise at least one of viruses, malware or tools usable for gaining unauthorized access to the device.

Example 31 includes the elements of any of examples 29 to 30, wherein the threats existing in the physical environment comprise at least one of unauthorized users attempting to access the device or theft of the device.

Example 32 includes the elements of any of examples 24 to 31, wherein determining threats to the device based on at least one of the internal activity data or the external activity data comprises determining at least one of threats to device operation or threats to information stored in the device.

Example 33 includes the elements of example 32, wherein determining at least one of threats to device operation or threats to information stored in the device is based on threat detection polices in the device.

Example 34 includes the elements of any of examples 24 to 33, and further comprises causing any determined threats to be visualized to a user.

Example 35 includes the elements of any of examples 24 to 34, wherein determining mitigation operations in response to any determined threats comprises determining at least one of automated mitigation operations or manual mitigation operations.

Example 36 includes the elements of example 35, wherein the automated mitigation operations and manual mitigation operations are based on threat mitigation polices in the device.

Example 37 includes the elements of any of examples 35 to 36, wherein the automated mitigation operations comprise at least one of local mitigation operations executed within the device and remote mitigation operations executed outside of the device.

Example 38 includes the elements of any of examples 35 to 37, and further comprises causing the automated mitigation operations to be performed by at least one of the device or the remote resources.

Example 39 includes the elements of any of examples 35 to 38, and further comprises causing at least one of the automated mitigation operations or the manual mitigation operations to be visualized to the user.

Example 40 includes the elements of example 39, wherein visualizing the manual mitigation operations comprises visualizing at least one of a request to the user to connect to a system environment via a wired connection or suggestion that the user connect to an alternative system environment.

Example 41 includes the elements of any of examples 39 to 40, and further comprises causing a query to determine if the user has undertaken any manual mitigation operations to be visualized to the user.

Example 42 includes the elements of any of examples 24 to 41, and further comprises causing data regarding at least one of the threats or the mitigation operations to be transmitted to the remote resources via the communication module.

Example 43 includes the elements of any of examples 24 to 42, wherein determining mitigation operations in response to any determined threats comprises determining at least one of automated mitigation operations or manual mitigation operations and causing the automated mitigation operations to be performed by at least one of the device or the remote resources.

Example 44 includes the elements of example 43, and further comprises at least one of causing at least one of the automated mitigation operations or the manual mitigation operations to be visualized to the user or causing a query to determine if the user has undertaken any manual mitigation operations to be visualized to the user.

According to example 45 there is provided a system including at least one device, the system being arranged to perform the method of any of the above examples 24 to 44.

According to example 46 there is provided a chipset arranged to perform the method of any of the above examples 24 to 44.

According to example 47 there is provided at least one machine readable medium comprising a plurality of instructions that, in response to be being executed on a computing device, cause the computing device to carry out the method according to any of the above examples 24 to 44.

According to example 48 there is provided at least one device configured for a context-aware threat management system, the device being arranged to perform the method of any of the above examples 24 to 44.

According to example 49 there is provided a context-aware threat management system. The system may comprise means for receiving internal activity data from security services within a device, means for receiving external activity data from remote resources external to the device, means for determining threats to the device based on at least one of the internal activity data or the external activity data and means for determining mitigation operations in response to any determined threats.

Example 50 includes the elements of example 49, wherein the means for receiving internal activity data from security services within the device comprise means for receiving security data related to at least one of device configuration, device operation or device content.

Example 51 includes the elements of any of examples 49 to 50, wherein the means for receiving external activity data from the remote resources comprise means for receiving data related to at least one of threats existing in a systemic environment capable of communicating with the device or threats existing in a physical environment in which the device is operating.

Example 52 includes the elements of any of examples 49 to 51, wherein the means for determining threats to the device based on at least one of the internal activity data or the external activity data comprise means for determining at least one of threats to device operation or threats to information stored in the device.

Example 53 includes the elements of any of examples 49 to 52, and further comprises means for causing any determined threats to be visualized to a user.

Example 54 includes the elements of any of examples 49 to 53, wherein the means for determining mitigation operations in response to any determined threats comprise means for determining at least one of automated mitigation operations or manual mitigation operations.

Example 55 includes the elements of example 54, and further comprises means for causing the automated mitigation operations to be performed by at least one of the device or the remote resources.

Example 52 includes the elements of any of examples 54 to 55, and further comprises at least one of means for causing at least one of the automated mitigation operations or the manual mitigation operations to be visualized to the user or means for causing a query to determine if the user has undertaken any manual mitigation operations to be visualized to the user.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device for use with a context-aware threat management system, comprising:
    a communication circuitry to interact with at least remote resources external to the device;
    a trusted execution environment (TEE);
    a hostile environment detection circuitry secured within the TEE;
    security services secured within the TEE;
    wherein:
    the hostile environment detection (HED) circuitry is configured to:
        receive internal activity data from said security services;
        receive external activity data from the remote resources via the communication circuitry, wherein the external activity data comprises data received from the physical environment including at least people, structures and vehicle proximate to the device;
        determine threats to the device by evaluating the internal activity data and the external activity data based on at least one threat detection policy that identifies activities or combinations of activities that identify a threat for which mitigation operations are needed;
        cause a list of alternative access points to connect to the Internet to be presented to a user along with safety and reliability data about each alternative access point; and
        determine mitigation operations in response to any determined threats; and
    user interface circuitry to at least visualize data related to at least one of the threats or the mitigation operations employing augmented reality functionality wherein at least one display in the user interface circuitry presents the data related to at least one of the threats or the mitigation operations superimposed over a view of a physical environment in which the device is operating.

2. The device of claim 1, wherein the remote resources comprise at least one computing device accessible via a wide area network (WAN), the at least one computing device including at least one of information technology (IT) services, global threat intelligence services or reputation services.

3. The device of claim 1, wherein the HED circuitry being to receive internal activity data from security services within the device comprises the HED circuitry being to receive security data related to at least one of device configuration, device operation or device content.

4. The device of claim 1, wherein the HED circuitry being to receive external activity data from the remote resources comprises the HED circuitry being to receive data related to at least one of threats existing in a systemic environment capable of communicating with the device or threats existing in a physical environment in which the device is operating.

5. The device of claim 1, wherein the HED circuitry being to determine threats to the device based on at least one of the internal activity data or the external activity data comprises the HED circuitry being to determine at least one of threats to device operation or threats to information stored in the device.

6. The device of claim 1, wherein the HED circuitry being to determine mitigation operations in response to any determined threats comprises the HED circuitry being to determine at least one of automated mitigation operations or manual mitigation operations.

7. The device of claim 6, wherein the HED circuitry is further to cause the automated mitigation operations to be performed by at least one of the device or the remote resources.

8. The device of claim 6, wherein the HED circuitry is further to at least one of:
cause the user interface circuitry to visualize at least one of the automated mitigation operations or the manual mitigation operations to the user; or
cause the user to be queried via the user interface, the query being to determine if the user has undertaken any manual mitigation operations visualized by the user interface circuitry.

9. The device of claim 1 wherein said augmented reality functionality includes at least one of indicia and images superimposed over a physical environment seen by a user as video captured by a camera.

10. A method for context-aware threat management, comprising:
receiving, with hostile environment detection (HED) circuitry secured within a TEE of a device, internal activity data from security services secured within said TEE;
receiving, with said HED circuitry, external activity data from remote resources external to the device, wherein the external activity data comprises data received from the physical environment including at least people, structures and vehicle proximate to the device;
determining, with said HED circuitry, threats to the device by evaluating the internal activity data and the external activity data based on at least one threat detection policy that identifies activities or combinations of activities that identify a threat for which mitigation operations are needed;
determining, with said HED circuitry, mitigation operations in response to any determined threats;
causing, with said HED circuitry, a list of alternative access points to the Internet to be presented to a user along with safety and reliability data about each alternative access point; and
visualizing data related to at least one of the threats or the mitigation operations employing augmented reality functionality wherein at least one display in user interface circuitry in the device presents the data related to at least one of the threats or the mitigation operations superimposed over a view of a physical environment in which the device is operating.

11. The method of claim 10, wherein receiving internal activity data from security services within the device comprises receiving security data related to at least one of device configuration, device operation or device content.

12. The method of claim 10, wherein receiving external activity data from the remote resources comprises receiving data related to at least one of threats existing in a systemic environment capable of communicating with the device or threats existing in a physical environment in which the device is operating.

13. The method of claim 10, wherein determining threats to the device based on at least one of the internal activity data or the external activity data comprises determining at least one of threats to device operation or threats to information stored in the device.

14. The method of claim 10, wherein determining mitigation operations in response to any determined threats comprises determining at least one of automated mitigation operations or manual mitigation operations.

15. The method of claim 14, further comprising:
causing the automated mitigation operations to be performed by at least one of the device or the remote resources.

16. The method of claim 14, further comprising at least one of:
causing at least one of the automated mitigation operations or the manual mitigation operations to be visualized to the user; or
causing a query to determine if the user has undertaken any manual mitigation operations to be visualized to the user.

17. The device of claim 10 wherein said augmented reality functionality includes superimposing at least one of indicia and images over a physical environment seen by a user as video captured by a camera.

18. At least one non-transitory machine-readable storage medium having stored thereon, individually or in combination, instructions that when executed by one or more processors result in the following operations for context-aware threat management comprising:
receiving, with hostile environment detection (HED) circuitry secured within a TEE of a device, internal activity data from security services secured within said TEE;
receiving, with said HED circuitry, external activity data from remote resources external to the device, wherein the external activity data comprises data received from the physical environment including at least people, structures and vehicle proximate to the device;
determining, with said HED circuitry, threats to the device by evaluating the internal activity data and the external activity data based on at least one threat detection policy that identifies activities or combinations of activities that identify a threat for which mitigation operations are needed;
determining, with said HED circuitry, mitigation operations in response to any determined threats;
causing, with said HED circuitry, a list of alternative access points to the Internet to be presented to a user along with safety and reliability data about each alternative access point; and
visualizing data related to at least one of the threats or the mitigation operations employing augmented reality functionality wherein at least one display in user interface circuitry in the device presents the data related to at least one of the threats or the mitigation operations superimposed over a view of a physical environment in which the device is operating.

19. The non-transitory machine-readable storage medium of claim 18, wherein receiving internal activity data from security services within the device comprises receiving security data related to at least one of device configuration, device operation or device content.

20. The non-transitory machine-readable storage medium of claim 18, wherein receiving external activity data from the remote resources comprises receiving data related to at least one of threats existing in a systemic environment capable of communicating with the device or threats existing in a physical environment in which the device is operating.

21. The non-transitory machine-readable storage medium of claim 18, wherein determining threats to the device based on at least one of the internal activity data or the external activity data comprises determining at least one of threats to device operation or threats to information stored in the device.

22. The medium of claim 18, wherein determining mitigation operations in response to any determined threats comprises determining at least one of automated mitigation operations or manual mitigation operations.

23. The non-transitory machine-readable storage medium of claim 22, further comprising instructions that when executed by one or more processors result in the following operations comprising:
   causing the automated mitigation operations to be performed by at least one of the device or the remote resources.

24. The non-transitory machine-readable storage medium of claim 22, further comprising instructions that when executed by one or more processors result in the following operations comprising at least one of:
   causing at least one of the automated mitigation operations or the manual mitigation operations to be visualized to the user; or
   causing a query to determine if the user has undertaken any manual mitigation operations to be visualized to the user.

25. The non-transitory machine-readable storage medium of claim 18 wherein said employing augmented reality functionality includes superimposing at least one of indicia and images over a physical environment seen by a user as video captured by a camera.

* * * * *